United States Patent [19]
Early et al.

[11] 3,906,782
[45] Sept. 23, 1975

[54] ISOSTATIC CRUSH STRENGTH TEST SYSTEM

[75] Inventors: Jack J. Early, Perth Amboy, N.J.; Alfred Stawsky, Bronx, N.Y.

[73] Assignee: Engelhard Minerals & Chemicals Corporation, Murray Hill, N.J.

[22] Filed: Feb. 4, 1974

[21] Appl. No.: 439,566

[52] U.S. Cl. .................................. 73/94; 73/103
[51] Int. Cl.² ........................................... G01N 3/10
[58] Field of Search .................. 73/94, 103; 138/93

[56] References Cited
UNITED STATES PATENTS
2,578,031  12/1951  Aubrey, Jr. et al. ................... 73/94
3,593,749  7/1971  Reardon ............................... 138/93

Primary Examiner—Jerry W. Myracle

[57] ABSTRACT

An isostatic test system useful for the isostatic testing of frangible structures, such as honeycomb ceramic monolith structures useful as catalyst supports, is provided by a combination of elements including means for providing a pressurized fluid, a rigid container, a pressure-expansible fluid impermeable means for receiving the pressurized fluid and adapted for insertion within said container to encompass or surround the structure for isostatic testing therein, fluid pressure measuring means communicating with said pressure-expansible fluid impermeable means for measuring fluid pressure therein and means communicating said means for providing pressurized fluid with said pressure-expansible fluid impermeable means for pressuring said pressure-expansible fluid impermeable means.

17 Claims, 14 Drawing Figures

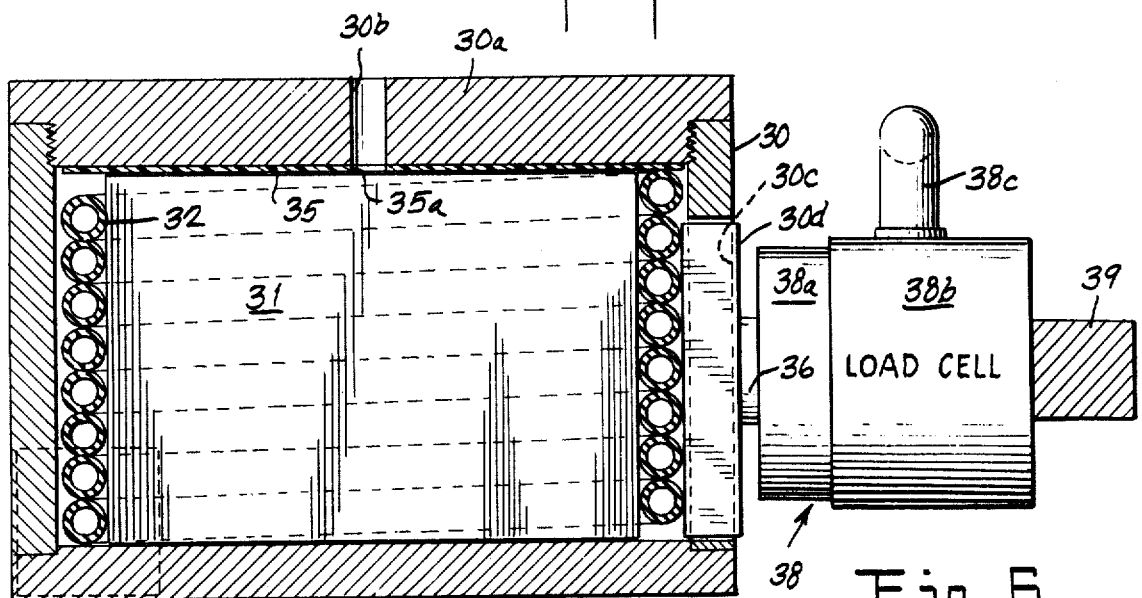
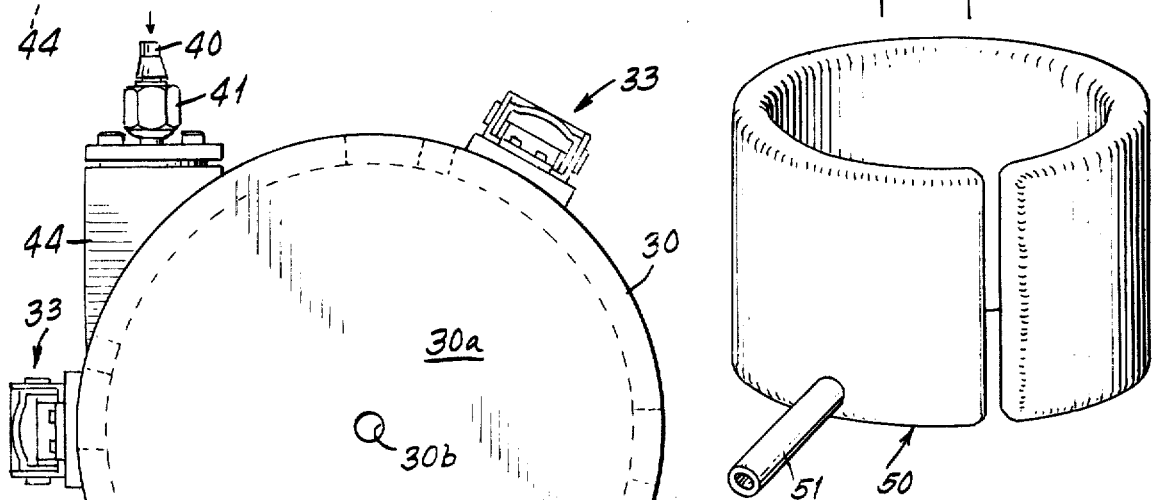
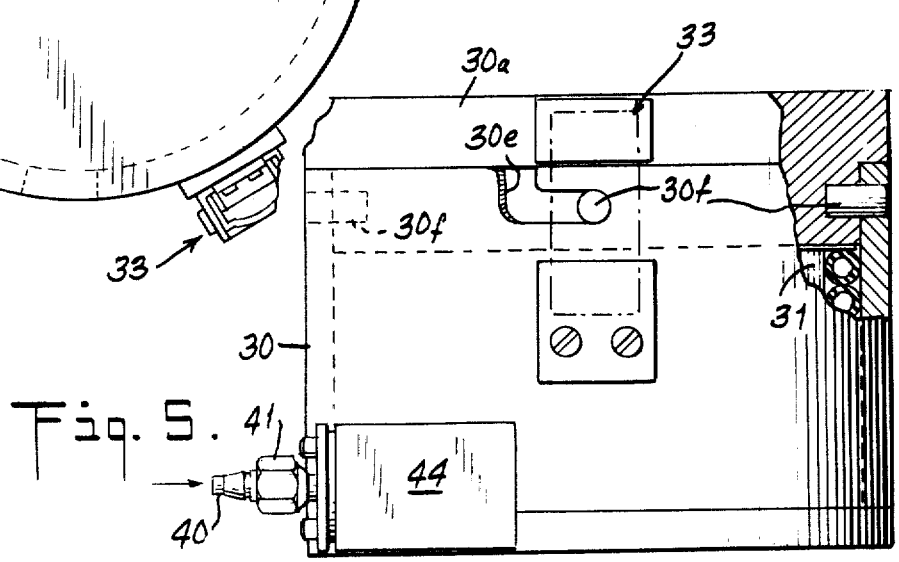

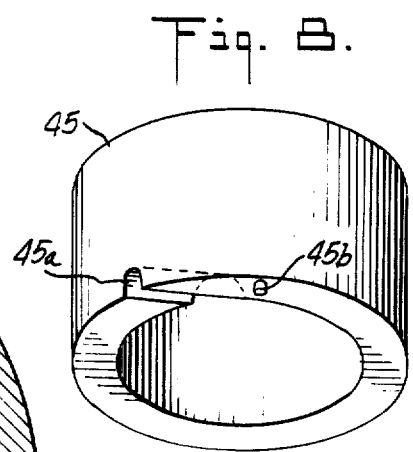
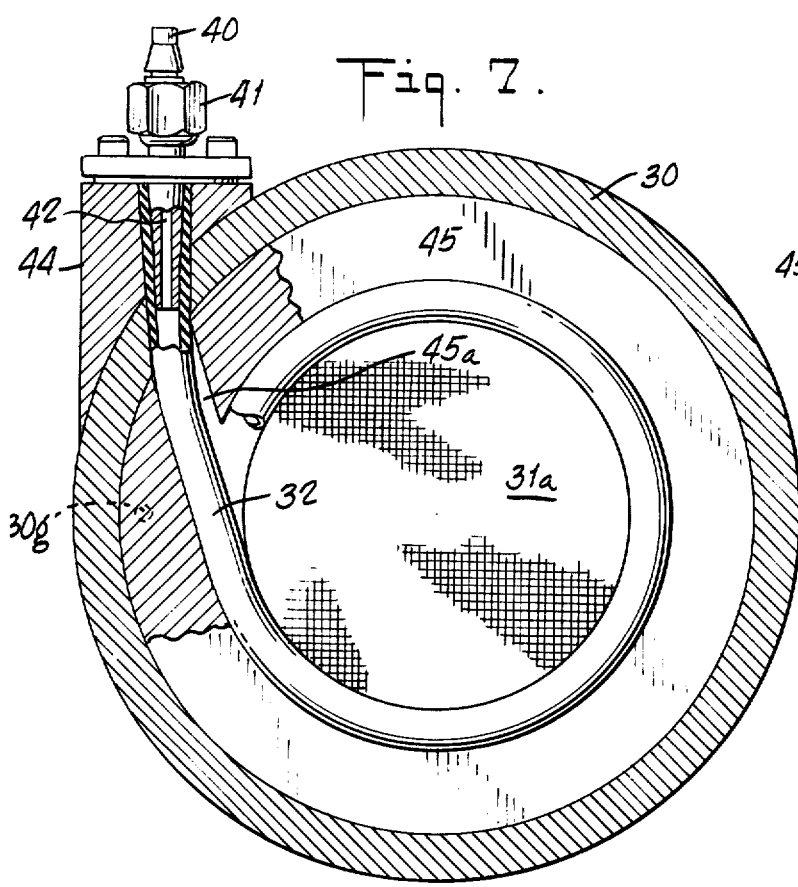
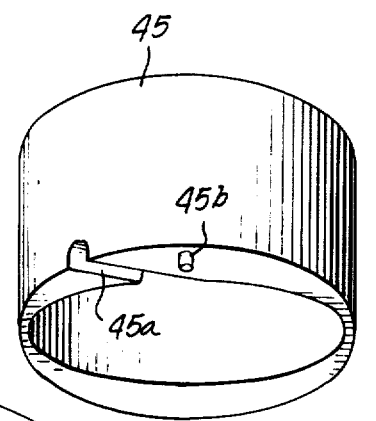
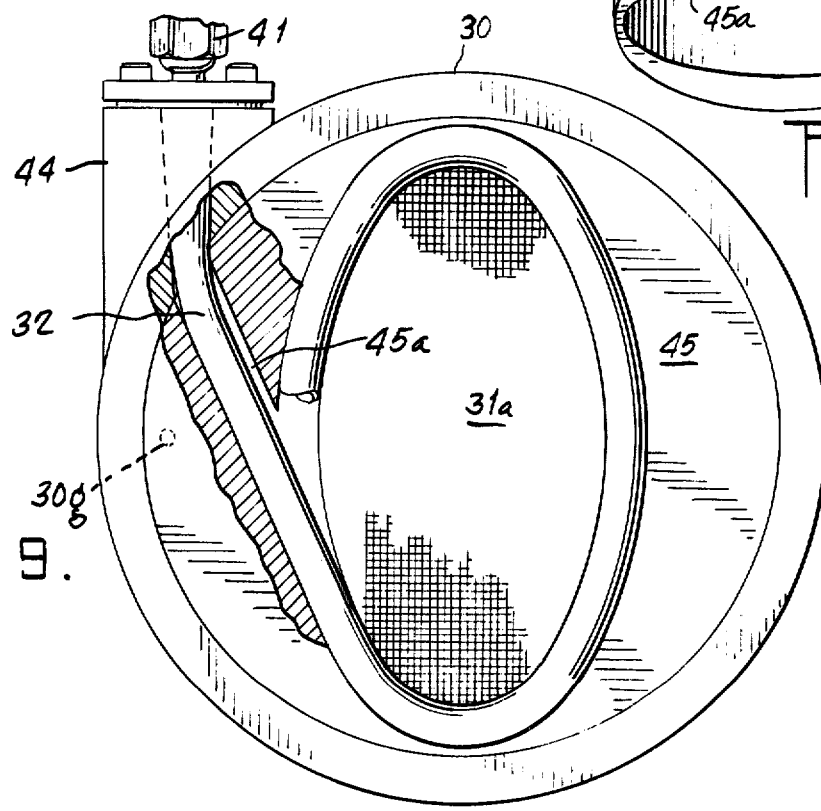

ISOSTATIC CRUSH STRENGTH TEST SYSTEM

This invention relates to testing systems and apparatus useful in connection therewith. More particularly, this invention relates to an isostatic test system. In accordance with one embodiment this invention is directed to an isostatic test system useful for the isostatic testing of honeycomb ceramic monoliths useful as catalyst supports. In accordance with another embodiment, this invention is directed to an apparatus useful in an isostatic test system for the isostatic testing of honeycomb ceramic monoliths useful as catalyst supports. In still another embodiment, this invention is directed to a method for the isostatic testing of honeycomb ceramic monoliths useful as catalyst supports.

The isostatic testing of materials and structures is known. Various systems, apparatus for use in connection therewith and techniques are known for the isostatic testing of materials and structures. For the most part, however, such systems, apparatus and techniques have not been completely satisfactory, such as when employed for the testing of honeycomb ceramic monoliths and similar structures proposed for use as catalyst supports for use in connection with devices and systems for the elimination of pollutants, such as hydrocarbons and carbon monoxide, from internal combustion engine exhaust. It is important to measure the isostatic crush strength of honeycomb ceramic monoliths. The physical durability of these honeycomb ceramic monolith structures is of great importance in determining their usefulness, especially when also provided with or containing a catalyst, in automotive applications and other applications where they are subject to shock and vibration. A test system which provides a good reliable measure of the physical durability of the aforementioned structures is important to help qualify the usefulness of such structures and the ceramic materials making up the structures and would also be useful for quality control purposes.

It is an object of this invention to provide a simple, useful and practical test system for the isostatic testing of materials, such as honeycomb ceramic monoliths and the like.

It is another object of this invention to provide an improved technique for the isostatic testing of frangible or crushable structuring, such as honeycomb ceramic monoliths useful as catalyst supports.

How these and other objects of this invention are achieved will become apparent in the light of the accompanying drawings. In at least one embodiment of this invention, at least one of the foregoing objects will be achieved.

The various embodiments and techniques in accordance with the practices of this invention are illustrated in the accompanying drawings wherein:

FIG. 1 schematically illustrates the test system in accordance with this invention for the isostatic testing of crushable or frangible materials or structures;

FIG. 3 is a cross-sectional view taken along line 3—3 of FIG. 2;

FIG. 4 is a plan view of another embodiment of a container in accordance with the practices of this invention for holding the structure to be isostatically tested;

FIG. 5 is a side view in partial cross section of the container illustrated in FIG. 4;

FIG. 6 is a perspective view of a pressure-expansible fluid impermeable element in the form of a cuff useful in the test system in accordance with this invention FIG. 7 is a plan, partially broken away, view of a rigid container and insert therein for the isostatic testing of special size structures;

FIG. 8 is a perspective view of an insert useful in connection with the rigid container illustrated in FIG. 7;

FIG. 9 is a plan, partially broken away, view of a container similar to that illustrated in FIG. 7 and insert therein suitable for the isostatic testing of a structure having an ellipitcal cross-section;

FIG. 10 is an insert useful in connection with the rigid container illustrated in FIG. 7;

In accordance with this invention it has been discovered that an isostatic test system particularly useful for the isostatic crush testing of frangible structures, such as honeycomb ceramic monolith structures useful as catalyst supports, and other materials is provided by a combination of elements including means for providing a pressurized fluid, a rigid container, pressure-expansible fluid impermeable means for receiving the pressurized fluid and adapted for insertion within said container to encompass or surround the structure or material for isostatic testing therein, fluid pressure measuring means communicating with said pressure-expansible fluid impermeable means for measuring fluid pressure therein and means communicating said means for providing pressurized fluid with said pressure-expansible fluid impermeable means for pressurizing said expansible fluid impermeable means.

Figure 1:
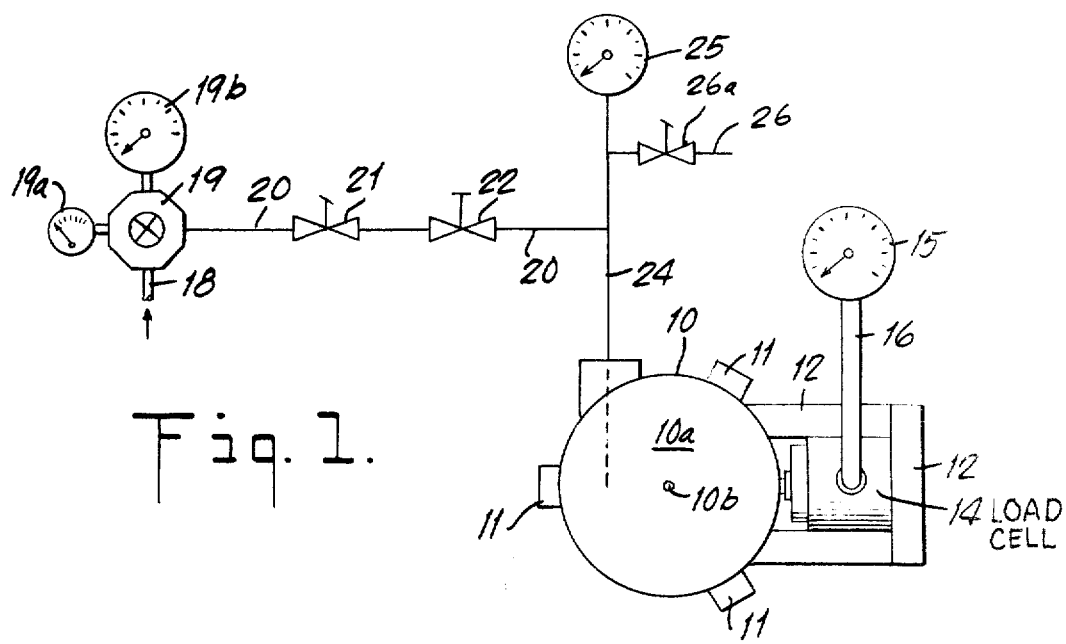

The description of the invention in its various embodiments is now made with reference to the accompanying drawings:

Referring now to FIG. 1 which schematically illustrates one embodiment of the isostatic test system in accordance with this invention, the material or structure, not shown, to be isostatically tested, is positioned within container 10, which is provided with quick opening latch-type clasps 11, for closing top 10a of container 10 after the structure for testing has been placed therein. Yoke 12 fixed to container 10 carries load cell 14. The load being experienced by load cell 14 is indicated on dial 15 attached to load cell 14 by column 16.

In the operation of the test system illustrated in FIG. 1 the structure to be isostatically tested is placed within container 10 and pressure-expansible fluid impermeable means, such as rubber latex tubing, not shown, is positioned within container 10 in the annulus defined by the inner wall of container 10 and the outside of the material or structure placed therein for testing so as to surround the outside of the structure completely. Pressurized fluid from a suitable source, not shown, such as a tank of high pressure nitrogen gas, is introduced via line 18, pressure-regulating valve 19 provided with pressure reading dials 19a and 19b, line 20, toggle valve 21 and metering valve 22 and then via line 24 into the pressure-expansive fluid impermeable means within the aforementioned annular space within container 10. As the pressurized fluid or gas thus flows into the pressure-expansible fluid impermeable means within container 10 the pressure therein increases and the pressure or force applied to the test structure or material therein also increases. The pressure of the fluid introduced into the pressure expansible fluid impermeable means within the container is increased until the applied pressure is sufficient to fracture or break the test structure or material therein. An indication of the fracture or failure under pressure of the structure or material being tested might be evidenced by a puff of dust emanating from hole 10b in cover 10a or a sudden drop in the applied pressure. By observing the applied pressure on gauge 25 or on load cell gauge 15 and by means of associated recording devices the pressure at which the test structure or material isostatically failed is observed and determined. Vent line 26 provided with vent valve 26a is employed to relieve the pressure applied to the pressure-expansible fluid impermeable element within container 10 prior to the opening of container 10 and removal of the test specimen, now fractured, before employing the test system for another test.

Figure 2:
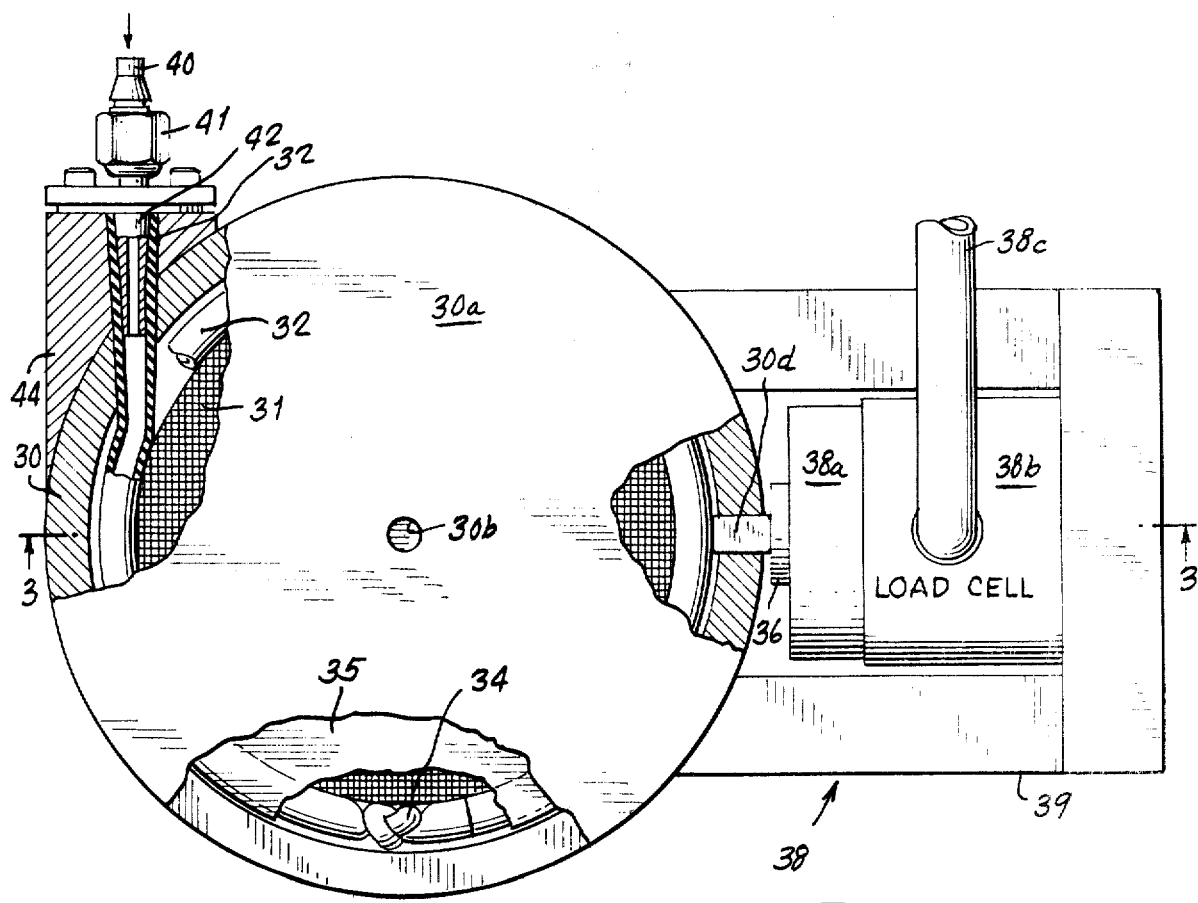
FIG. 2 is a plan view, partially broken away, illustrating a honeycomb ceramic monolith in position for isostatic testing in a container in accordance with this invention.

Referring now to FIGS. 2 and 3 of the drawings, there is illustrated therein in greater detail a portion of the test assembly or system of this invention. Container 30 has inserted therein honeycomb ceramic structure or monolith 31 for isostatic crush testing. After monolith 31 has been inserted within container 30 a length of pressure-expansible fluid or gas impermeable tubing 32 is helically wound around monolith 31 from the bottom to the top thereof. Knot 34 at the end of tubing 32 serves to close off the end of tubing 32. As illustrated tubing 32 is completely helically wound around the outside of monolith 31 to completely enclose or encircle the outside thereof. After monolith 31 has been so prepared within container 30, a loose fitting pad 35, such as a Teflon pad, is placed on top of monolith 31. Cover 30a is then threadedly engaged to container 30 to close container 30 with monolith 31 therein. After cover 30a has been screwed down completely it is backed off a fraction. A vent hole 35a is provided in pad 35 matching vent hole 30b provided in cover 30a.

Side wall of container 30 has a vertical rectangular slot 30c therein. Rectangular bar 30d is provided within slot 30c. Bar 30d bears against and is in direct contact with the helically wound coils of tubing 32. Bar 30d on the outside of container 30 is in direct mechanical contact with pressure plate 36 of a load cell, generally indicated by reference numeral 38, made up of elements 38a and 38b. Load cell 38 is maintained in contact with bar 30d by yoke 39 and the read-out of the force or pressure experienced by pressure plate 36 of load cell 38 is indicated on a dial recording instrument, not illustrated, carried on post 38c of load cell 38.

In the operation of the assembly illustrated in FIGS. 2 and 3 for the isostatic crush testing of honeycomb ceramic monolith 31, pressurized gas from a suitable source, not illustrated, is introduced via line connection 40 through fitting 41 and fitting inlet 42 provided within bottom inlet structure 44 of container 30 into tubing 32. As the pressurized gas is thus introduced into tubing 32 which is preferably a rubber latex tubing, tubing 32 expands and presses against the inner wall of container 30 and against pressure bar 30d. An equal and opposite force is also uniformly exerted by expanding tubing 32 against the outside of ceramic monolith 31. As the pressure of the gas introduced within tubing 32 is increased, a pressure will be reached which will crush the ceramic monolith. When that pressure is reached and the ceramic monolith 31 is crushed or fails, this crushing pressure will be indicated by a sudden sharp drop-off of the pressure in tubing 32 and sometimes by a slight puff of dust from vent hole 30b in cover 30. By means of the dial or suitable recording instrument associated with load cell 38 and carried on column or post 38c a record of the pressure or force applied to monolith 31 to failure is observable and/or recorded.

FIGS. 4 and 5 illustrate another embodiment of container 30 in accordance with this invention. In the embodiment illustrated in FIGS. 4 and 5 container 30a is provided with quick opening latch-type clasps 33.

In the assembling of cover 30a to container 30 of the container illustrated in FIGS. 4 and 5, cover 30a is provided with right angle passageways 30e therein for engagement and locking with pins 30f carried at the top of container 30 and extending radially inwardly thereof. As illustrated in the embodiment of the test apparatus and container shown in FIGS. 4 and 5, cover 30 is placed so as to engage pins 30f in passageways 30e of cover 30a and cover 30a turned to move passageway 30e to bring pins 30f to the end thereof as illustrated in FIG. 5.

FIG. 6 is a perspective view of another pressure-expansible fluid impermeable means for use in connection with the assembly and apparatus in accordance with this invention. The pressure-expansible fluid impermeable means illustrated in FIG. 6 comprises a flat hollow belt 50 of suitable material, such as latex rubber, or other pressure-expansible impermeable material, natural or synthetic. When encircled, as illustrated, belt 50 serves as a cuff to surround the ceramic monolith to be tested. The pressurizing gas is introduced into belt or cuff 50 via tubing 51 which is desirably made of the same material as belt or cuff 50.

The pressure-expansible fluid impermeable belt or cuff in FIG. 6 provides some advantage over a helically wound coil of tubing in that the operator of the test system need not be engaged in the careful helical winding of tubing to completely surround the monolith being tested but merely can first install the cuff in the container and the insert the ceramic monolith to be tested within the container.

Referring now to FIGS. 7, 8, 9 and 10 of the drawings, there are illustrated therein other embodiments of the apparatus in accordance with this invention, the illustrated apparatus being particularly useful for the isostatic crush testing of structures or materials having a shape of that of a right angle cylinder. In the embodiments illustrated in FIGS. 7, 8, 9 and 10 the same reference numerals have been employed for the same or equivalent elements illustrated in the other figures of the drawings, particularly FIGS. 3, 4 and 5.

FIG. 7 shows an assembly useful for the isostatic crush testing of small cylindrical structures, such as a small right angle cylinder honeycomb ceramic monolith structure 31a similar to the monolith structure 31a illustrated in FIGS. 2 and 3. The container 30 is substantially the same as that illustrated in the preceding figures and includes, associated therewith, line connection 40, fitting 41, fitting inlet 42 and inlet structure 44 for an introduction of a pressurized stream of gas, such as gaseous nitrogen, for pressurizing tubing 32. Tubing 32 is helically wound around ceramic monolith 31 within the annular space provided by hollow cylindrical insert 45 and monolith structure 31a. Insert 45 is illustrated in FIG. 8.

As illustrated insert 45 is provided with a bottom groove or passageway 45a through which tubing 32 passes to permit its helical winding around monolith structure 31a. Centering pin 45b is provided in the bottom of insert 45 for matching and insertion into hole 30g provided in the bottom of container 30.

In the operation of the apparatus illustrated in FIG. 7 insert 45 would be fitted within container 30 with tubing 32 extending along passageway 45a of the insert. Ceramic monolith 31a to be tested would then be placed within insert 45 and tubing 32 helically wound around monolith 31a completely surrounding the outside thereto. Thereupon, container 30 would be closed and pressurized gas from tubing 32 via tubing 40, fitting 41 and inlet fitting 42 introduced to pressurize tubing 32. Upon increasing the pressure of the gas introduced to tubing 32, a pressure is reached at which the ceramic monolith 31a undergoing isostatic crush test fails.

Referring now to FIGS. 9 and 10 of the drawings, there is illustrated therein an apparatus similar to that illustrated in FIGS. 7 and 8. The assembly illustrated is useful for the testing of ceramic monoliths and other structures and materials having an elliptical horizontal cross-section. The operation of the assembly and apparatus illustrated in FIGS. 9 and 10 when employed in the testing system in accordance with this invention is the same as that described hereinabove in connection with FIGS. 7 and 8.

Referring now to FIGS. 11, 12, 13 and 14, there are illustrated therein embodiments of apparatus and assemblies useful in the isostatic crush test system in accordance with this invention. In FIGS. 11, 12, 13 and 14, the same reference numerals have beem employed to identify the same or equivalent elements also found in the apparatus illustrated in the other figures and described hereinabove.

Figure 11:
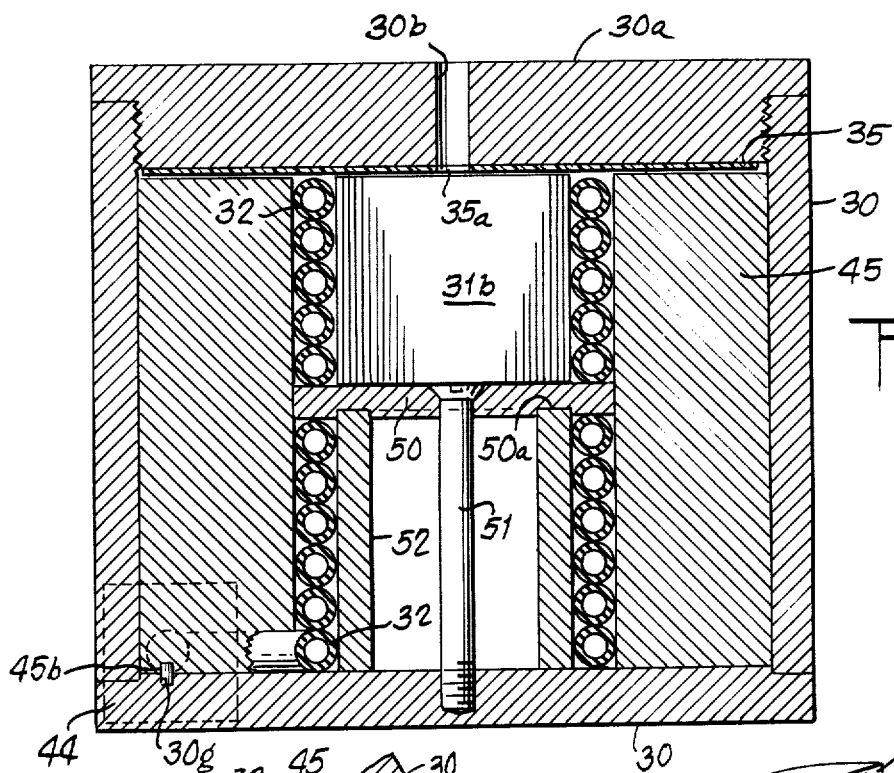
FIG. 11 is a cross-sectional elevational view of another container useful in the test system in accordance with this invention.

FIG. 11 illustrates container 30 provided with a cylindrical insert 45 fitted within container 30. Ceramic monolith 31b to be submitted to isostatic crush testing is disposed in container 30 and within insert 45 on top of platform 50. Platform 50 is centrally positioned within container 30 by post 51 which is threadedly engaged in the bottom of container 30. Platform 50 within container 30 is also supported by cylinder 52 centrally and axially disposed in the lower portion of container 30. Platform 50 within container 30 is supported by cylinder 52 by the upper end of cylinder 52 being fitted within circular groove 50a provided in the bottoms of platform 50.

In the assembling of the apparatus for the isostatic crush testing of ceramic monolith 31b insert 45 is positioned within container 30 by positioning pin 45b carried on the bottom of insert 45 into a matching hole 30g provided in the bottom of container 30. Cylinder 52 is then positioned within container 30 and platform 50 placed thereon and positioned by threadedly engaging post 51 into the bottom of container 30. Ceramic monolith 31b is then placed on the top of platform 50. Pressure-expansible fluid impermeable tubing 32 from inlet fitting 44 is then helically wound around the annular space defined by the outside of cylinder 52 and the inside of insert 45. Tubing 32, as illustrated, is helically wound up to the bottom of platform 50 and then passes through groove 50b on the outer periphery of platform 50, not illustrated in FIG. 11 but shown in FIG. 12, and is then helically wound about ceramic monolith 31b within the annular space defined by the outside of ceramic monolith 31b and the inside of insert 45. As illustrated, tubing 32, which is knotted or closed at the end, not shown, is helically wound around the outside of ceramic monolith 31b to completely surround or encompass the same. A loose fitting Teflon pad 35 provided with hole 35a in the center thereof is then placed on the assembly of insert 45 and monolith 31b and cover 31a threadedly engaged to container 30 to close the same. Opening 30b in cover 30a is positioned above matching hole 35a in pad 35.

Upon the application of pressurized fluid or gas to tubing 32, by means not shown, through inlet fitting 44, tubing 32 is pressurized. As the pressure of the fluid or gas introduced to tubing 32 is increased, a pressure will be reached at which ceramic monolith 31b will be crushed or fail. As noted previously, indication of the isostatic crush pressure on the ceramic monolith 31b and its failure is signaled by a sudden sharp reduction in the applied pressure within the tubing 32 and sometimes by a slight puff of dust emanating from hole 30b in cover 30a. The apparatus illustrated in FIGS. 11 and 12 and its assembly are useful for the isostatic crush testing of small right angle cylinder ceramic monoliths and similar structures, smaller than container 30. Various size inserts 45 can be employed depending upon the size of the structure to be tested.

Figure 14:
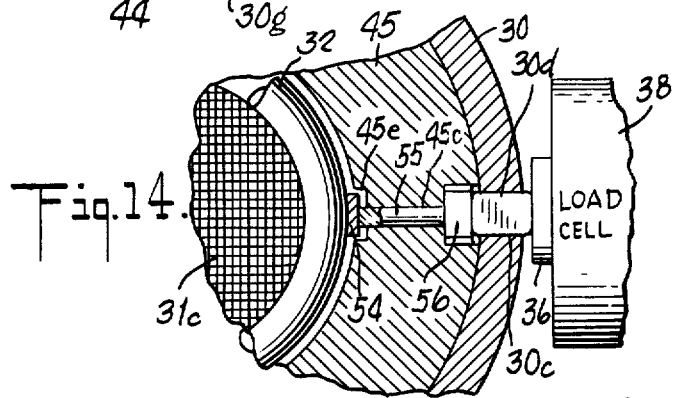
FIG. 14 is a partial cross-sectional view taken along line 14—14 of FIG. 13.
Figure 12:
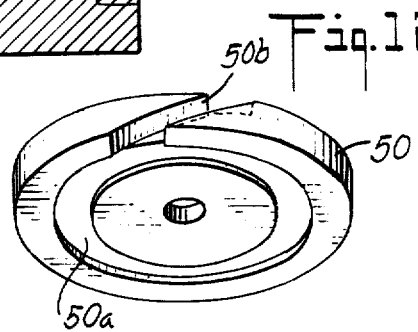
FIG. 12 is a perspective view of an element useful in connection with the container illustrated in FIG. 11.
Figure 13:
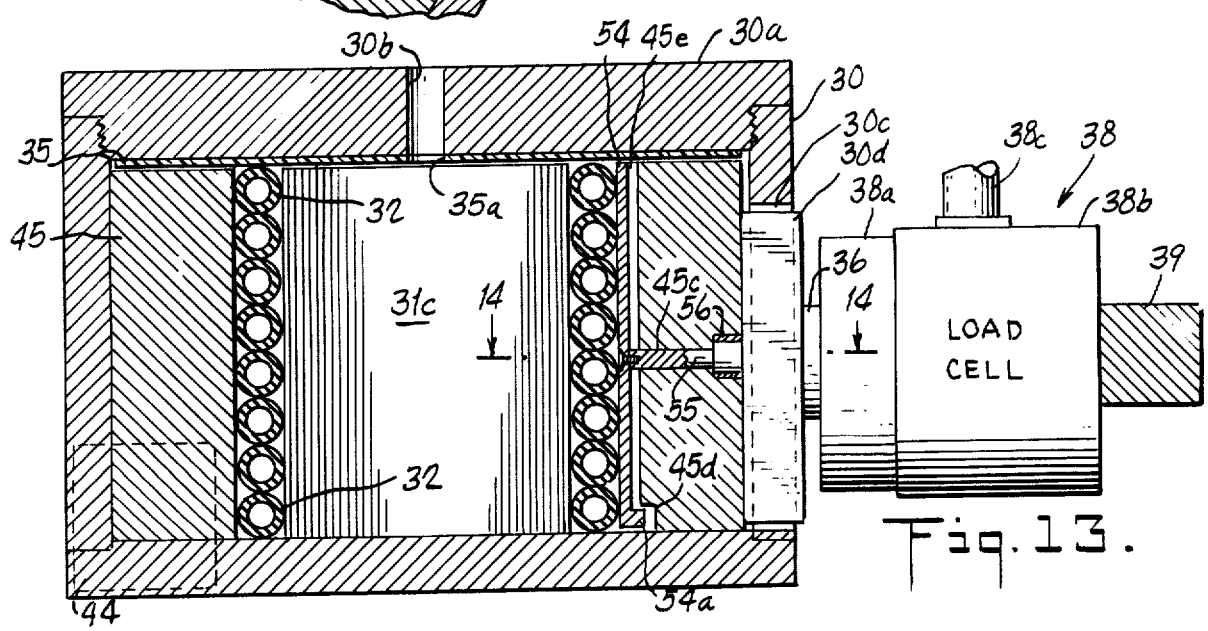
FIG. 13 is a side view in partial cross section showing a load cell useful in association with a rigid container for the isostatic testing of structures.

FIGS. 13 and 14 illustrates other apparatus and assemblies useful for the isostatic crush testing of structures and similar materials in accordance with this invention. As illustrated the assembly of FIG. 13 differs from the assembly of FIG. 11 in that the assembly of FIG. 13 is provided with a load cell to indicate the pressure or force applied to the ceramic monolith undergoing testing.

In FIG. 13 insert 45 is disposed within container 30. Ceramic monolith 31c to be tested is then provided within insert 45, as illustrated. Insert 45 is provided with pressure bar 54 extending along the length or height of insert 45 within cutout 45e thereof. Pressure bar 54 is mechanically connected with rod 55 extending through insert 45 via opening 45c therethrough. Rod 55 has fixed at its other end cap 56. Cap 56 is positioned to bear against rectangular bar 30d positioned within vertical slot 30c provided within the side wall of container 30. Bar 30d in turn bears against pressure pad or plate 36 associated with load cell 38 made up of the elements 38a and 38b, as illustrated. Load cell 38 is maintained associated with container 30 such that pressure plate 36 is maintained in contact with bar 58 by yoke 39. In this connection reference is made to FIGS. 2 and 3 of the drawings already described to indicate the position of yoke 39 relative to load cell 38.

In the isostatic crush testing of ceramic monolith 31c in the apparatus and assembly illustrated in FIG. 13, insert 45 is placed within container 30 and positioned such that bar 54 and rod 55 and cap 56 are in direct mechanical contact with bar 30d to bear against pressure plate 36 of load cell 38. The positioning of insert 45 is facilitated by detent 54a carried on the bottom of pressure bar 54 for engagement within a matching cutout portion 45d provided at the bottom of insert 45.

Ceramic monolith 31c is placed within insert 45. Tubing 32 extending from inlet fitting 44 is then helically wound around ceramic monolith 31c within the annular space defined by the outside of monolith 31c and the inside of insert 45 and bar 54 to completely encompass the outside thereof. The free end of tubing 32, not shown, is closed by suitable means such as a knot. Pad 35 with central hole 35a is then placed on top of ceramic monolith 31c and cover 30a screwed onto the top of container 30 to close the container. Upon the application of pressurized fluid or gas to tubing 32 the pressure and force exerted by expanding tubing 32 will be exerted against the outside of ceramic monolith 31c and a corresponding equal pressure or force will be exerted through bar 54, rod 55, cap 56 and pressure bar 30d against pressure plate 36 of load cell 38. The resulting force thus exerted by tubing 32 against ceramic monolith 31c and load cell 38 will be evidenced by a pressure gauge or other pressure recording device, not illustrated, carried on the end of post 38c associated with load cell 38.

It has been mentioned heretofore in describing one embodiment of an element of the apparatus or system of this invention, viz. the pressure-expansible fluid impermeable cuff or belt illustrated in FIG. 6, that this element provides some advantages. It is preferred, however, to employ tubing as the pressure-expansible fluid impermeable means for applying pressure to the ceramic monolith to be subjected to isostatic crush testing. Tubing provides greater flexibility with respect to the testing of structures having different exterior shapes, sizes and surface conditions.

Moreover, upon helically winding of the tubing around the ceramic monolith the isostatic crush strength test can be readily carried out. Upon the completion of the test, as evidenced by the failure of the ceramic monolith tested, the tubing can be unwound from around the monolith, thereby providing free annular space for removal of the tested monolith. This would not require turning the container upside down to remove the monolith. A conventional vacuum suction device could then be used to remove any broken pieces or fragments from the inside of the container.

Tubing useful in the practice of this invention is available in various sizes not only with respect to outside diameter but also with respect to wall thickness, and also is available in various materials, natural and synthetic.

As will be apparent to those skilled in the art in the light of the foregoing disclosure, many modifications, alterations and substitutions are possible in the practice of this invention without departing from the spirit or scope thereof.

We claim:

1. An isostatic test system comprising supply means for providing pressurized fluid, a rigid container, pressure-expansible fluid impermeable tubing for receiving pressurized fluid adapted for insertion within and helically wound within said rigid container in the annular space provided between said container and material for isostatic testing therein, said tubing being closed at one end and open at the other end to receive said pressurized fluid, fluid pressure measuring means communicating with said tubing for measuring fluid pressure therein and conduit means communicating said supply means with said pressure-expansible tubing for introducing pressurized fluid into said tubing.

2. An isostatic test system in accordance with claim 1 wherein said means for providing pressurized fluid is a container provided with pressurized gas.

3. An isostatic test system in accordance with claim 2 wherein pressure regulating and reducing means is provided associated with said means for providing pressurized fluid to said pressure-expansible fluid impermeable tubing to control the pressure of the gas introduced into said pressure-expansible fluid impermeable tubing.

4. An isostatic test system in accordance with claim 1 wherein said pressure-expansible fluid impermeable tubing upon insertion within said rigid container and upon being pressurized by said pressurized fluid is in direct contact with said material for isostatic testing therein.

5. An isostatic test system in accordance with claim 1 wherein a load cell is provided in mechanical contact with said pressure-expansible fluid impermeable tubing within said container to measure the pressure exerted by said pressure-expansible fluid impermeable tubing upon said material within said container.

6. An isostatic test system in accordance with claim 1 wherein said rigid container is a cylindrical container open at the top, said container being provided with cover means for closing said container when said material for isostatic testing is placed therein.

7. An isostatic test system in accordance with claim 6 wherein a Teflon pad is provided between said cover and said material for isostatic testing within said container.

8. An isostatic test system in accordance with claim 1 wherein said pressure-expansible fluid impermeable tubing is supplied with pressurized fluid through a passageway through the wall of said container.

9. An isostatic test system in accordance with claim 1 provided with recording means associated with said fluid pressure measuring means for recording the pressure measured by said fluid pressure measuring means.

10. An isostatic test system in accordance with claim 1 wherein said means for providing pressurized fluid comprises means for providing pressurized liquid.

11. Apparatus useful for the isostatic testing of a cylindrical ceramic honeycomb monolith comprising a rigid container adapted to receive said monolith through an opening in the top of said container and to provide an annulus between said monolith and said container when said monolith is placed within said container through said top opening, a side opening provided through the bottom side wall of said container, pressure-expansible gas impermeable tubing closed at one end and open at the other end adapted to be disposed within said annulus and helically wound within said container within the annulus provided between said container and said monolith for isostatic testing therein, conduit means for supplying pressurized gas to said tubing via said other end through said side opening provided in the side wall of said container and means for closing said top opening of said container.

12. Apparatus in accordance with claim 11 wherein means is provided for measuring the gaseous pressure applied to said tubing.

13. Apparatus in accordance with claim 12 wherein a Teflon pad is disposed between said monolith and said top means for closing said opening of said container.

14. Apparatus in accordance with claim 11 wherein a load cell is provided in mechanical contact with said tubing when disposed within said annulus and surrounding said monolith for isostatic testing for measuring the pressure applied by said tubing upon said monolith.

15. A method for the isostatic testing of a honeycomb ceramic monolith structure which comprises placing said structure to be isostatically tested within a rigid confining zone, introducing pressure-expansible fluid impermeable tubing within the annular space defined by said structure and said zone and helically winding said tubing within said annular space to surround completely the outside of said structure within said zone, said tubing being closed at one end and open at the other end to receive pressurized fluid, and introducing pressurized fluid under controlled conditions with respect to increasing pressure into said tubing positioned in said annular space until the pressure applied to said structure by the expansion of said tubing is sufficient to fracture said structure.

16. A method in accordance with claim 15 wherein the pressure to which said pressure-expansible fluid impermeable tubing is subjected is recorded.

17. A method in accordance with claim 15 wherein said pressurized fluid is pressurized gas.

* * * * *